Oct. 6, 1964    J. T. FEID    3,151,700
FILM FACED ACOUSTICAL BODY AND METHOD OF MAKING SAME
Filed Aug. 11, 1961    2 Sheets-Sheet 1

INVENTOR
JACK T. FEID
BY
ATTORNEYS

Oct. 6, 1964 J. T. FEID 3,151,700
FILM FACED ACOUSTICAL BODY AND METHOD OF MAKING SAME
Filed Aug. 11, 1961 2 Sheets-Sheet 2
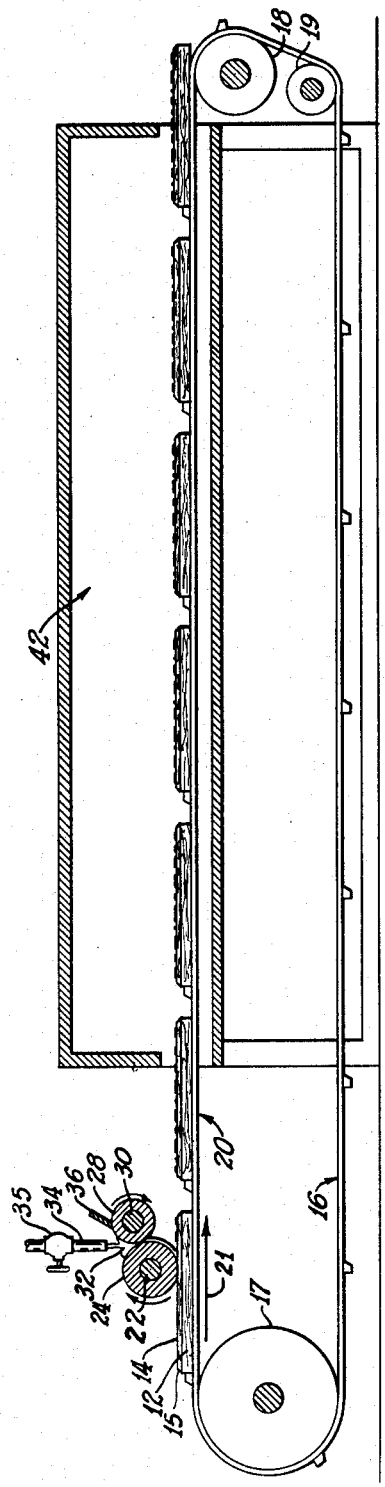
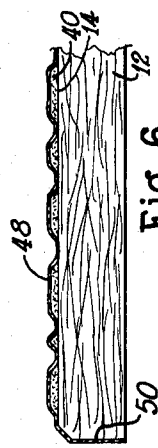
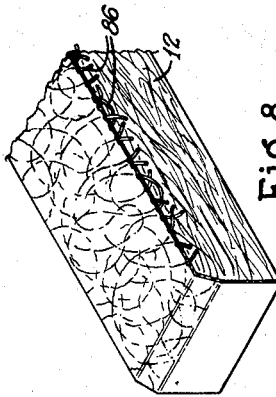
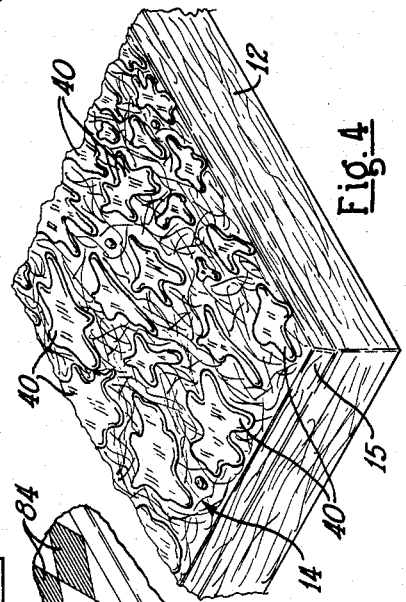
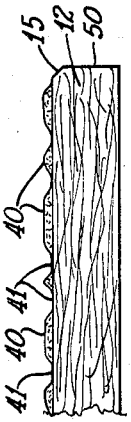
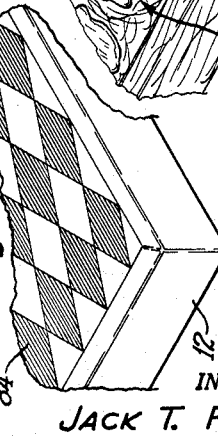
INVENTOR
JACK T. FEID
BY
ATTORNEYS

United States Patent Office 3,151,700
Patented Oct. 6, 1964

3,151,700
FILM FACED ACOUSTICAL BODY AND METHOD OF MAKING SAME
Jack T. Feid, Granville, Ohio, assignor to Owens-Corning Fiberglas Corporation, a corporation of Delaware
Filed Aug. 11, 1961, Ser. No. 130,930
25 Claims. (Cl. 181—33)

This invention relates to film-faced bodies and more particularly to porous bodies wherein a major surface of a body is surfaced with a resin film. The invention more especially pertains to substantially rigid fibrous boards or tiles preferably formed of mineral fibers such as fibers of glass, slag or argillaceous rock faced with resin film, the method of producing the film-faced bodies providing for many and various designs and decors in various colors and shades and in bas relief enhancing the visual and aesthetic properties or characteristics of the product rendering it admirably suitable as finish surfacing for ceilings, walls and the like.

Recent developments have been made in applying resin film to uncoated or unpainted fibrous boards or tiles in a manner as not to appreciably reduce or affect the sound-attenuating properties and characteristics of the porous or fibrous material. Such film coated boards lack eye appeal as they are devoid of highlights and shadows and hence find only limited use as surfacing for walls and ceilings because of the lack of attractive decor.

It has been found that the application of paint covering the entire surface of a porous body or fibrous board reduces its sound-attenuating characteristics and properties especially where nonporous paint is employed. Furthermore a painted surface is difficult to clean and has no distinctive eye or aesthetic appeal.

An object of the invention is the provision of a product comprising a substantially rigid porous body having a primary surfacing component on a major surface of the body providing slightly raised regions on a portion of the surface and a secondary surfacing material in the form of a self-supporting resinous film covering the major surface and primary surfacing material in intimate contiguous contact with the raised regions and adjacent areas.

Another object of the invention is the provision of a product comprising a substantially rigid porous body having a major surface on which is disposed a material covering a portion of the major surface and oriented to provide a decor or design and a self-supporting resin film covering the major surface and the material thereon in intimate contiguous contact with the material and adjacent areas whereby the decor or design is visibly reproduced by surface contour of the film.

Another object of the invention is the provision of a porous body or fibrous tile having a major surface provided with a decor of material wherein the material occupies random or spaced areas of the surface of the porous body or tile upon which is superposed a flexible or pliable comparatively thin, self-supporting film applied in the manner to cause the same to be intimately contoured to the surface without adhesive bonding of the film to the surface.

Another object of the invention resides in a product comprising a substantially rigid body of fibrous material embodying specially prepared surface areas to provide a distinctive design or decor covered with a self-supporting resin film applied to the surface by a method, which in effect, establishes a mechanical bond of the film with the contours of the surface without appreciable impairment of the sound-attenuating properties of the fibrous material provided by the myriad of minute interstices or pores in the fibrous material.

Another object of the invention is the provision of a film-faced fibrous board or body such as a body formed of fibrous glass having comparatively high insulating and acoustic properties provided on a major surface with spaced areas or regions occupied by a material of a desired color or having particular light reflecting or diffusing characteristics with a self-supporting film of translucent, opaque or colored resin or plastic superposed upon the prepared surface and the film held to such surface providing a visual design of contrasting colors, highlights and shadows in bas-relief presenting a distinctive and pleasing appearance and a surface which may be readily cleaned, the smooth character of the film deterring the accumulation of dust on its surface.

Another object of the invention resides in a method of producing a film-faced body, board or tile, wherein the film-facing is contoured into intimate contiguous relation with an entire major surface of the body, board or tile, the surface of the same being provided with a design or pattern and the film being of a character whereby the minute areas thereof adjacent interstices or recesses of the surface contour of the body, board or tile is readily susceptible of diaphragmatic action or vibration so as not to appreciably reduce the sound-attenuating characteristics provided by the fibrous structure of the body, board or tile while preferably maintaining the film in an impervious state.

Another object of the invention resides in a method of superposing a self-supporting resin film or sheet on a pre-treated surface and applying pressure to the film or sheet causing it to be forced into intimate contiguous relation with the ridges and recesses of the treated surface forming a smooth impervious envelope which functions to enhance the strength of the fibrous body.

Another object of the invention is the provision of a method of forming a film-faced fibrous tile, board or the like wherein the tile or board receives a quantity of paint or coating material applied to form random or haphazard areas of coating or paint by underfeeding the paint or coating material to the surface and of covering such surface with a thin self-supporting resin film assembled under pressure with the tile or board in a manner whereby the film is mechanically bonded to the tile or board, the painted or coated regions of the board contouring the film to produce a visual appearance of highlights and shadows which is distinctive and the differences in color or shading between the painted or coated regions and the adjacent areas being emphasized by the different light reflecting or diffusing characteristics of various areas of the film resulting from the intimate contouring of the film with the adjacent surface.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 2 is a semi-diagrammatic elevational view partly in section of apparatus for performing certain steps in the method of producing the product of the invention;

FIGURE 4 is a fragmentary isometric view illustrating a portion of a body, tile or board illustrating a random design of primary surfacing media thereon;

FIGURE 5 is a side elevational view of the body, tile or a board provided with the random design of surfacing media illustrated in FIGURE 4;

FIGURE 6 is a sectional view of the finished product illustrating the contour of the film-facing on the body, tile or board;

FIGURE 7 is a fragmentary isometric view illustrating another pattern or design of surfacing media, and FIGURE 8 is a fragmentary isometric view illustrating an acoustical tile with an underlay or primary surfacing media of bonded mat of fibers.

The product of manufacture of the invention preferably comprises a porous base material or rigid body formed of compressed mineral fibers integrated by a suitable binder but it is to be understood that the body may be formed of other materials providing a porous structure of a character facilitating the use of the method of vacuum or pressure application of a self-supporting resin or plastic film as a covering or facing on a surface of the body having a primary surfacing component or underlay of material enhancing the decor or visual aesthetic appearance of the product without adversely affecting its acoustical or sound-attenuating properties.

Figure 1:
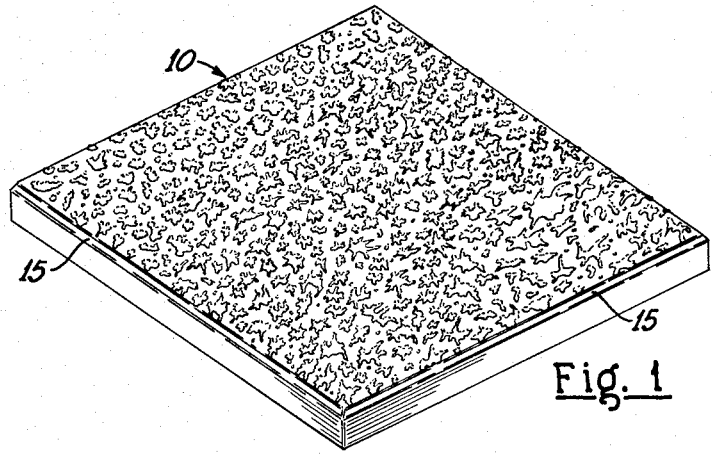
FIGURE 1 is an isometric view of a film-faced body, tile or board of the invention.

Referring to the drawings in detail, FIGURE 1 illustrates one form of product 10 of the invention particularly usable as an acoustic tile for application to the ceiling or walls of a room or other enclosure.

In a preferred embodiment, the tile is fashioned of mineral fibers having a major surface treated or prepared with a primary component or decor covered with a self-supporting resin film which is in contiguous relation with the treated major surface and the film adhered to the edges of the tile or body, the region of the film on the major surface being preferably unattached to the tile or body or to the design or pattern provided by the primary component on the body. The film-faced tile or product 10 is hereinafter described in further detail in connection with the method of manufacture.

The body, tile or board 12 of the film-faced product 10 may be formed of any type of fibers or material providing a porous structure but it is preferable to form the same of mineral fibers, such as glass fibers, compressed to a suitable density rendering the body, tile or board substantially rigid. The fibers are held together by a binder which may be a thermoplastic resin such as melamine compounds or a thermosettable resin such as phenol-formaldehyde or other suitable binder for permanently maintaining the fibers of the tile or board in compressed condition.

It has been found that a tile or board 12 of mineral fibers of a density of about eleven and one-half pounds per cubic foot and a thickness of from one-half inch to one inch provides a rigid body suitable as an acoustical tile endowed with excellent acoustical or sound-attenuating properties.

A rigid board formed of fibers may be made of a density of from five to twenty five pounds per cubic foot and of suitable thickness may be utilized. The fibrous tile or body is preferably formed of a mass of glass fibers or other fibers, the mass of fibers being compressed to the desired thickness and density and the binder in the mass cured or treated to hold the fibers in a permanently compressed dense condition.

The tiles or boards 12 are preferably square for ease in installation on ceilings or walls, a conventional size being about 12 x 12 inches, but it is to be understood that tiles or boards of other dimensions may be employed. A major surface of the fibrous board may be made smooth by sanding or other abrasion step if an exceptionally smooth surface is desired. The edges of the body or board may be chamfered as indicated at 15.

A major surface of the tile or body 12 is provided with a primary surfacing component of material applied or distributed in a manner to form a decor, design or pattern of any desired character as by applying paint or coating material to a portion of the face or surface of the body. The pattern illustrated in FIGURES 1 and 4 through 6 is a random or haphazard motif or decor fashioned by method steps hereinafter described whereby the design is nonrepetitive. A face of the board may be provided with a symmetrical design such as that shown in FIGURE 7 which may be applied by stenciling or other suitable means preparatory to receiving a facing of a comparatively thin, self-supporting resin film.

An important feature of the decor or appearance of the product illustrated in FIGURE 1 resides in applying material such as a coating, paint or similar material on a surface of the body 12 in spaced zones providing irregular or haphazard configurations of coated and uncoated regions covered by the self-supporting resinous film, which, when the latter is forced or drawn into minute contiguous contact with the treated surface of the porous body whereby the coated regions slightly raise or elevate the film above the uncoated regions giving a bas-relief appearance greatly improving the aesthetic attractiveness of the finished product.

FIGURE 2 is illustrative of an apparatus for applying coating material or primary surfacing component to a major or flat face or surface 14 of a rigid body 12 having porous characteristics wherein the surface after treatment is replete with randomly arranged coated and uncoated zones of various sizes and configurations. The arrangement shown in FIGURE 2 is inclusive of an endless conveyor or belt 16 mounted upon supporting rolls 17, 18 and 19, the upper flight 20 of the conveyor 16 being adapted to receive and advance the rigid bodies, fibrous boards or unfinished tiles 12 to receive the coating material.

The rigid bodies 12 may be fashioned of fibrous material other than mineral fibers, and may be of any composition endowed with porous characteristics.

Disposed above the left end region of the conveyor, as viewed in FIGURE 2, is a rotatable shaft 22 carrying an applicator roll or member 24 which is adapted to deliver coating material onto the body by wiping contact of the coating material with the major surface 14 of the fibrous body 12. Arranged adjacent the roll 24 is a metering roll 28 mounted upon a rotatable shaft 30 parallel with the shaft 22, the roll 28 being adjustable toward and away from the applicator roll 24 by conventional adjusting means (not shown).

Coating material 32, which may be paint or other suitable material for partially coating the surface 14, is delivered into the nip region adjacent and above the rolls 24 and 28, as shown in FIGURE 2, the adjacent surface regions of the rolls providing a temporary reservoir for the paint or coating material to be applied to the bodies 12. By adjusting the position of the roll 28 with respect to the roll 24 the amount of paint or coating material on the applicator is limited or metered by the space between the rolls.

The paint or coating material is conveyed through a duct or tube 34 from a supply (not shown), the rate of delivery of the paint or coating material to the temporary reservoir being controlled by a valve means 35. A doctor blade or scraper member 36 engages the surface of the metering roll 28 to scavenge or scrape coating material therefrom to provide an accurate metering of the film of paint or coating material adhering to the applicator roll 24. The support for the shaft 22 mounting the applicator roll 24 may be adjusted relative to the major surface 14 of the body 12 to obtain proper wiping application of the paint or coating material onto the surface 14.

The position of the metering roll 28 is adjusted so as to restrict the amount of paint or coating material delivered onto the bodies or tiles 12 so as to incompletely coat or cover the surfaces 14 of the boards or tiles. The surfaces 14 of the bodies or tiles are underfed with paint or coating material whereby the surfaces are starved of paint or coating delivered by wiping action onto the advancing bodies.

This method of application of material forms blotches or spots 40 of various sizes and shapes in random or haphazard distribution on the surface 14 with voids or uncoated portions or regions 41 (shown in FIGURE 5) between adjacent blotches. The blotches or spots 40 form a primary surfacing component on the body 12.

The upper flight 20 of the conveyor 16 is continuously advanced in a righthand direction indicated by the arrow 21 as viewed in FIGURE 2 and conveys the coated or treated bodies 12 through a drying or curing oven 42 which may be heated by suitable heating means or heated air passed through the oven in order to set or dry the paint or coating delivered onto the bodies at the applicator station. The partially coated body or tile 12 emerging from the oven or curing means 42 is of the character shown in FIGURES 4 and 5.

Another phase in the process or method embraces the application of a self-supporting film of yieldable or flexible material preferably a resinous or plastic material. A yieldable plastic film is preferred and the film made comparatively thin in order to provide vibratile characteristics to enhance or promote sound-attenuation.

The resin or plastic film covering is applied by pressure so as to lie unattached but in intimate contiguous contact with the coated and uncoated regions of the surface 14 and is preferably adhered to the edges 50 of the body 12.

Figure 3:
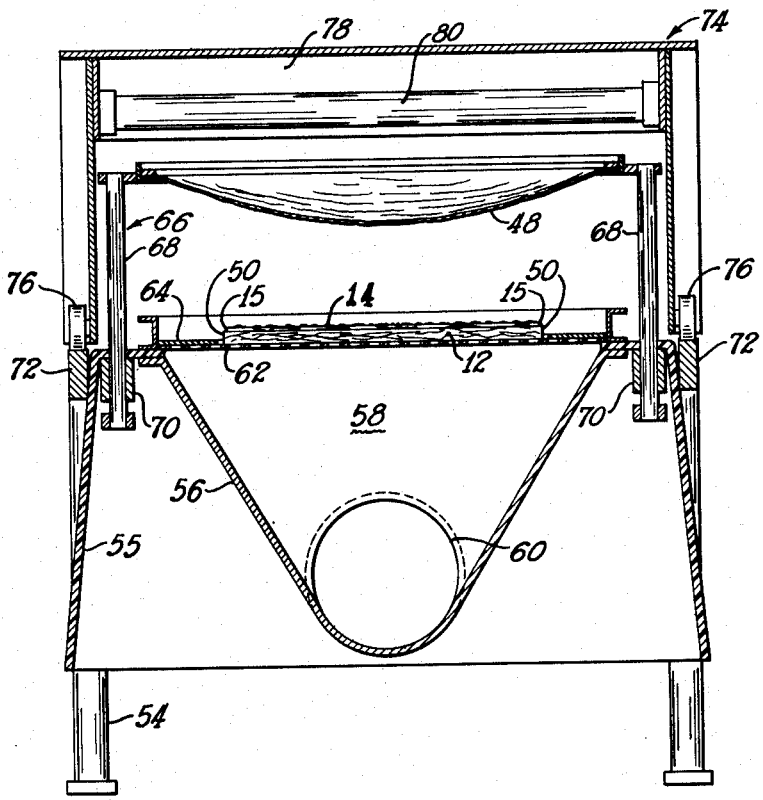
FIGURE 3 is a semi-diagrammatic elevational view partly in section of an arrangement for applying a film-facing or surfacing medium to the body, tile or board.

With particular reference to FIGURE 3, the apparatus for applying a self-supporting film or covering 48, forming a secondary surfacing component of the product, is inclusive of a frame 54 supporting a casing 55, within which is a second casing 56 which defines a chamber 58 in which is impressed suction or reduced pressure. A conduit or pipe 60 opening into the chamber 58 is connected with a suction blower or other means (not shown) for impressing or establishing reduced or subatmospheric pressure in the chamber 58.

Arranged above the open region of the casing 56 is a foraminous member or screen 62 arranged to support a body or tile 12 which has been previously treated with coating material as hereinbefore described, the reverse side or surface of the body engaging the screen 62. The portion of the screen 62 surrounding the body or tile 12 is covered by an imperforate mask 64 which may be paper, sheet metal or other suitable material. A vertically movable frame 66 is mounted over the screen, the frame 66 including rods 68 which are vertically slidable in guides or bushings 70 carried by the casing 55.

Means (not shown) is provided for moving the frame 66 vertically in order to move the resin film 48 into juxtaposition with the obverse surface 14 of a body or tile 12.

The main frame 54 is provided with horizontally arranged parallel ways or bars 72 which support a carriage 74, the latter equipped with rollers 76 which engage the upper surfaces of the ways 72, the carriage being movable lengthwise of the ways. The carriage 74 is fashioned with a compartment or chamber 78 enclosing heating elements 80 adapted to heat the film 48 when the carriage 74 is moved into position with the heating elements 80 adjacent the film.

The heating step is performed with the supplemental frame 66 in elevated position as shown in FIGURE 3 with the film disposed adjacent the heating elements 80. The film is of resinous character such as polyvinyl chloride and is comparatively thin, preferably being of a thickness of about two mils but a film of greater thickness up to about seven or eight mils in thickness may be employed as a film-facing for a body 12.

From the effect of the heating of the film 48, the film first expands because of normal coefficient of expansion and then contracts due to the molecular memory of its manufacture. The film retains a characteristic of the maximum temperature at which tension is induced in the film and this occurs or is established during the calendering operation of the film. At a certain temperature range, the film starts to shrink or contracts and as the temperature increases there will be an expansion indicated by a slight sagging of the film with respect to the supporting frame.

The heating of the film may be automatically controlled by suitable control and timing devices (not shown). The frame 66 is then moved downwardly to depose the slightly sagging film 48 onto the treated or coated surface 14 of the fibrous tile or rigid body 12 supported by the screen 62. The subatmospheric pressure or suction developed in the chamber 58 by a suction blower or vacuum pump (not shown) connected with the pipe 60 causes air pressure to act downwardly upon the upper surface of the film 48 as the reduced pressure is effective through the porous body to establish a differential pressure between the upper and lower surfaces of the film.

The atmospheric pressure above the film forces the softened plastic film into intimate contiguous contact with all surface portions and regions of the upper face of the body 12 and the primary surfacing component on the body. The softened and pliable condition of the film under pressure results in its being forced into the depressed areas formed on the upper face of the body 12 and in intimate contact with the raised areas or lands on surface provided by the blotches 40 of paint or coating so that a repetition of the surface contour provided by the primary surfacing component or the coated and uncoated regions of the surface is fashioned of the film 48 to form a bas-relief which accentuates highlights and shadows or variations in color of the regions of the lands and the regions of the depressions.

The forcing of the film into continuous intimate contiguous contact with all minute regions of the area covered by the film has a particular visual effect due to the fact that the comparatively smooth lands beneath the film cause a difference in light diffusion or reflection between those areas of the film and the film areas covering the depressions adjacent the lands. The film is forced down over the chamfered regions 15 and around the sides or edges 50 of the body and tightly embraces the edges without wrinkling or folding of the film at the corners due to the pliability or flow characteristics of the film.

The edge regions 50 of the body 12 are provided with an adhesive which is incompatible with the film so as to adhesively adhere or join the film to the edge regions of the body. An adhesive that has been found satisfactory for use, particularly with polyvinyl chloride film is a chloroprene rubber marketed commercially under the trade mark Neoprene contained in a solvent such as methyl ethyl ketone. Through the adhesive juncture of the film at the edge regions of the body coupled with the substantial pressure forcing the film into intimate contiguous contact with all areas adjacent the major surface of the body, the film is mechanically integrated or held in fixed relation to the body and the surface contour of the film is permanently configured to the surface contour engaged by the film.

The pressure in the chamber 58 is released to facilitate removal of the completed film-faced body, tile or board 10. As the pliable film is comparatively thin, it may be readily vibrated under the influence of sound waves and hence the acoustical properties of the porous body 12 are not appreciably modified by the film-facing or covering providing the secondary surfacing component of the product. The resin film is unplasticized and is preferably of a thickness of about two mils. This thickness has been found to function satisfactorily, having effective vibratile characteristics to enhance sound-attenuation and minimizes the amount of resin used for the facing.

However, good results have been attained through the use of films of between one mil and eight mils in thickness. The use of a thicker film tends to reduce the acoustic properties or sound-attenuating characteristics to a certain extent. The thin film effects more efficient sound-attenuation. In the interest of economy and for efficient sound-attenuation it is preferable to make the film as thin as is practical commercially.

Various kinds of resinous or plastic self-supporting films may be employed as the secondary or finish coating or covering on the body or tile. Self-supporting films of the following materials may also be employed, monopolymer chloride, polyethylene, polyvinyl fluoride, polycarbonate, and polyester films such as marketed under the trade name Mylar. The acoustic properties of the product in a measure reside in the ability of the film-facing to vibrate in order to effectively dissipate or attenuate sound energy.

The body, board or tile when formed of a compressed mat of mineral fibers is preferably of a density of about eleven and one-half pounds per cubic foot but a satisfactory substantially rigid body or acoustical tile or board may be of a density of between five pounds and thirty pounds per cubic foot depending upon the end use for the material and the acoustical properties desired.

Other patterns, designs and decors may be applied as a primary component on the surface of the rigid body or tile 12. For example, as shown in FIGURE 7, the primary component may be a design or decor of raised regions 84 which may be painted or stenciled on a board in a design of repetitive character and faced with a self-supporting resin film in the manner above described.

FIGURE 8 is illustrative of a fibrous board or acoustical tile 12 having a primary component or decor provided by bonded swirl mat or bonded strand mat which is comparatively thin and disposed upon a major surface of the board or tile 12. The swirl mat 86 is prefabricated of fibrous or filamentary material in strand or yarn formation fashioned in loops or swirls providing a comparatively thin web, the strands of filamentary or fibrous materials being bonded by a suitable bonding agent into an integrated mat or web.

The swirl mat or bonded mat 86 may be laid upon the rigid body 12 or if desired may be adhesively joined thereto and the secondary component or covering of self-supporting film drawn over the mat facing on the board in the manner above described.

Other forms of surface treatment or primary surfacing component may be applied to the surface of the board such as a glass textile or fabric or a layer of chopped strands of glass fibers or other mineral material may be employed.

Other materials may be deposited upon the board as a primary surfacing to secure a distinctive appearance such as fleck or stencils fashioned with various designs. Powders or comminuted materials of desired colors, glass beads, clay beads or the like may be sprinkled on or deposited on the surface of the porous body or board. The facing film may be white or pigmented with suitable colors depending upon the appearance desired for the end product.

Thus it is possible to obtain various visual characteristics by changing the color of the film or by changing the underlayer or primary surfacing material applied to a major surface or face of the porous body 12. A design may be attained by overprinting the film with conventional inks. Where an overprinted film is employed, it is desirable that the film have comparatively low stretch characteristics so that a minimum of distortion occurs in affixing the film over the surface of the body as any appreciable stretching may distort the overprinted design.

Where the color of the primary design component is different from the color of the areas adjacent the design, such decor in conjunction with the color of the film-facing results in a visual appearance of different shades of one color or different colors depending upon the color of the film.

For example, a board or body having regions provided with raised portions in white and the adjacent areas uncolored or the natural brown color of the fibrous board, the combination gives the appearance of white areas accentuated by adjacent gray areas, the latter provided by the color of the fibrous board.

Products embraced within the invention provide for an almost infinite number of configurations or decor on a major surface of a rigid porous body, tile or board in conjunction with a resinous or plastic film, white or colored. The design or decor of raised portions and depressions provided by the material comprising the primary surfacing component is virtually reproduced in the self-supporting film-facing. As the film is not bonded to, but in effect is mechanically integrated with the primary component on the fibrous body, the ability of the film to vibrate is not impaired so that effective sound-attenuating or sound energy dissipating characteristics are retained. The self-supporting film-facing provides a moisture resistant coating which may be readily cleaned to restore the appearance of the acoustical tile or board and which will not require painting or refinishing. The obverse surface of the film acts as a deterrent to the accumulation of dust and foreign matter so that the surface retains its distinctive appearance for longer periods of time than roughened surfaces that become clogged with dust or foreign matter.

It is apparent that, within the scope of the invention, modifications and different arrangements may be made other than as herein disclosed, and the present disclosure is illustrative merely, the invention comprehending all variations thereof.

I claim:

1. A substantially rigid porous body, a primary surfacing component on a surface of the porous body, and a secondary surfacing material covering the surface and primary surfacing component, said secondary surfacing material comprising a self-supporting impervious resin film in intimate contiguous unbonded contact with the primary surfacing component, said resin film being responsive to sound energy for attenuating sound waves.

2. A substantially rigid porous body, a primary surfacing component on a major surface of the porous body providing a plurality of spaced raised regions, and a secondary surfacing component comprising a self-supporting resin film covering the primary component and in intimate contiguous unbonded contact with the raised regions and adjacent areas, said resin film being responsive to sound energy for attenuating sound waves.

3. A substantially rigid porous body, a primary surfacing component on a major surface of the porous body providing a plurality of spaced raised regions, and a secondary surfacing component comprising a self-supporting impervious resin film covering the primary component and in intimate contiguous unbonded contact with the spaced raised regions and adjacent areas, said film secured to the edge regions of the porous body, the portion of said film adjacent the raised regions and adjacent areas being responsive to sound energy for attenuating sound waves.

4. A substantially rigid porous body, a primary surfacing component on a major surface of the porous body providing a plurality of spaced lands, and a secondary surfacing component comprising a self-supporting impervious resin film covering the primary component and in intimate contiguous unbonded contact with the spaced lands and adjacent areas, said film secured to the edge regions of the porous body.

5. A substantially rigid porous body, a primary surfacing material disposed on a major surface of the porous body providing spaced raised regions, and a secondary surfacing material covering the major surface and primary surfacing material, said secondary surfacing material comprising a self-supporting impervious resin film in intimate contiguous unbonded contact with the raised regions and adjacent areas, said film being a vinyl composition and responsive to sound energy for attenuating sound waves.

6. A substantially rigid porous body, a primary surfacing component on a major surface of the porous body providing a plurality of spaced covered regions, and a secondary surfacing component comprising a self-supporting impervious resin film covering the primary component and in intimate contiguous unbonded contact with the covered regions and adjacent areas.

7. A substantially rigid porous body, a primary surfacing material dispersed over a major surface of the porous body covering spaced regions of the surface, and a secondary surfacing material covering the major surface and dispersed primary surfacing material, said secondary surfacing material comprising a self-supporting impervious resin film in intimate contiguous unbonded contact with the dispersed material and adjacent areas.

8. An article of manufacture comprising a substantially rigid body of material of porous character, a surface of the body being partially coated with material dispersed on the surface in spaced areas, and a self-supporting film covering said surface in intimate unbonded contact with the coated and adjacent areas of the surface.

9. A substantially rigid body of porous character, a coating on a plurality of spaced areas of the body, and a self-supporting film of flexible character covering the coated and uncoated areas and in intimate unbonded contact therewith whereby the coated areas provide raised regions of the film.

10. A substantially rigid body of porous character having a flat surface, a coating on a plurality of spaced areas of the flat surface, and a self-supporting film of flexible character covering the entire flat surface and coated areas and in intimate unbonded contact therewith whereby the coated areas provide raised regions of the film, the film being adhered to the edge regions of the body defining the flat surface.

11. An article of manufacture comprising a substantially rigid body of mineral fibers, a surface of the body provided with material dispersed on the surface, and a self-supporting film covering said surface in intimate unbonded contact with the dispersed material and adjacent areas.

12. An acoustical tile comprising a substantially rigid body of bonded mineral fibers, means on a surface of the body providing raised regions, and a self-supporting plastic film covering the surface and raised regions and in intimate contiguous unbonded contact with the raised regions and adjacent areas providing a bas-relief appearance.

13. An acoustical tile comprising a substantially rigid body of bonded mineral fibers, a coating material of appreciable thickness on spaced zones of a surface of the body, and a self-supporting plastic film covering the surface bearing the spaced coated zones and in intimate contiguous unbonded contact with the coated zones and adjacent areas providing a bas-relief appearance.

14. An acoustical tile comprising a substantially rigid porous body, a web of filamentary material on a surface of the body, and a self-supporting plastic film covering the web of filamentary material and in intimate contiguous unbonded contact with all areas thereof providing a bas-relief appearance.

15. An acoustical tile comprising a substantially rigid body of glass fibers, a bonded mat of filamentary material on a surface of the body, a self-supporting plastic film covering the mat and in intimate contiguous unbonded contact therewith providing a bas-relief appearance.

16. A method of forming a film-faced substantially rigid body of porous character including the steps of applying material on a major surface of the body providing regions having different light diffusing characteristics, disposing a self-supporting film over the surface and material thereon, and applying pressure on the film to force the film into intimate unbonded contact with all regions of the surface.

17. A method of forming a film-faced substantially rigid body of porous character including the steps of applying material on a major surface of the body providing regions having different light diffusing characteristics, disposing a self-supporting resin film over the surface and material thereon, applying pressure on the film to force the film into intimate unbonded contact with all regions of the surface, and adhering the film to the edge regions of the body defining the major surface.

18. A method of forming a film-faced substantially rigid body of porous character including the steps of disposing material on a major surface of the body providing regions having different light reflecting characteristics, disposing a thin self-supporting film over the major surface and the material thereon, forcing the film onto the major surface of the body into intimate unbonded contact with the material, and adhering the film to edges of the body defining the major surface.

19. A method of forming a film-faced substantially rigid body of porous character including the steps of applying a coating material in spaced areas on a major surface of the body providing a plurality of coated and uncoated zones of the surface, disposing a self-supporting film over the entire major surface, exerting pressure on the film to force the film onto the major surface of the body into intimate unbonded contact with the coated and uncoated areas of the surface, and adhering the film to edges of the body defining the major surface.

20. A method of forming a film-faced substantially rigid body of porous character including the steps of advancing a body to an applying station, dispersing material on a surface of the body at said station in insufficient quantity to cover the surface whereby the surface region is replete with randomly arranged zones of the material, disposing a self-supporting film over the surface and material thereon, applying pressure to force the film into intimate contiguous unbonded contact with the material and adjacent areas, and adhering the film to the edge regions bounding the surface covered by the film.

21. A method of forming a film-faced substantially rigid body of porous character including the steps of advancing a body to a coating applying station, delivering coating material onto a surface of the body at said station in insufficient quantity to cover the surface whereby the surface region is replete with randomly distributed coated zones of varying contours separated by uncoated zones, setting the coating on the surface, disposing a self-supporting film over the coated surface, applying heat to soften the film, applying pressure to force the softened film into intimate contiguous unbonded contact with the coated and uncoated zones of the surface, and adhering the film to the edge regions bounding the surface covered by the film.

22. A method of forming a film-faced substantially rigid body of porous character including the steps of applying a coating material in spaced areas on a major surface of the body providing a plurality of coated and uncoated zones of the surface, disposing a self-supporting film of yieldable material over the entire major surface, establishing reduced pressure at the surface of the body obverse to the coated surface effective through the interstices of the porous body to force the film into intimate contiguous unbonded contact with the coated and uncoated areas of the major surface and the edge regions of the body, and adhesively securing the film to the edge regions of the body.

23. A method of forming a film-faced substantially rigid body of porous character including the steps of delivering coating material onto the obverse surface of the body to provide spaced coated zones and uncoated zones, setting the coating material, disposing a self-supporting film of stretchable material over the obverse surface, establishing a region of reduced pressure effective at the reverse surface and through the pores in the body to contour the film into intimate contiguous unbonded contact with the coated and uncoated zones of the obverse surface, and adhesively securing the film to the edge regions of the body.

24. A method of forming a film-faced substantially rigid body of porous character including the steps of applying a coating material in spaced areas on a major surface of the body providing a plurality of coated zones of the surface, disposing a self-supporting film on the major surface, establishing differential pressures adjacent the film at the major surface of the body to contour the film into intimate unbonded contact with the coated zones and adjacent areas, and adhering the film to edges of the body defining the major surface.

25. A method of producing a film-faced body of porous character including the steps of delivering coating material onto a major surface of the body to provide spaced coated zones and uncoated zones, setting the coating material on the surface, disposing a thin thermoplastic film adjacent the coated surface, heating the film to increase its pliability, and establishing differential pressure adjacent the film and body effective to force the film into intimate contiguous unbonded attachment with the coated and uncoated zones whereby the film at the coated zones of the surface is raised above the film at the uncoated zones.

References Cited in the file of this patent

UNITED STATES PATENTS

| | | |
|---|---|---|
| 1,997,359 | Cochrane | Apr. 9, 1935 |
| 2,045,312 | Roos et al. | June 23, 1936 |
| 2,184,140 | Cunnington | Dec. 19, 1939 |
| 2,400,346 | Glassey | May 14, 1946 |
| 2,562,711 | Gessler et al. | July 31, 1951 |
| 2,690,593 | Abercrombie | Oct. 5, 1954 |
| 2,802,764 | Slayter et al. | Apr. 13, 1957 |
| 2,806,812 | Merz | Sept. 17, 1957 |
| 2,814,077 | Moncrieff | Nov. 26, 1957 |